June 30, 1970  H. DE WEERD  3,517,781
DASHPOT WITH APERTURED PISTON, CYLINDER AND ROLLING, FLEXIBLE
SEAL THEREBETWEEN
Filed March 6, 1969

HERMAN De WEERD
INVENTOR.

BY Robert J. Schiller

ATTORNEY.

3,517,781
DASHPOT WITH APERTURED PISTON, CYLINDER AND ROLLING, FLEXIBLE SEAL THEREBETWEEN

Herman de Weerd, Arlington, Mass., assignor to Block Engineering, Inc., Cambridge, Mass., a corporation of Delaware
Filed Mar. 6, 1969, Ser. No. 804,926
Int. Cl. F16f 9/16
U.S. Cl. 188—94        3 Claims

ABSTRACT OF THE DISCLOSURE

An improved system for braking a reciprocable element toward the end of its travel and comprising a dashpot having two exit passageways for its working fluid. The dashpot also includes a rolling, everted flexible seal between the cylinder and piston, one of the exit passageways terminating in a port that is coverable by the seal at some position in the rolling travel of the seal.

---

This invention relates to braking systems and more particularly to a mechanical brake using a working fluid.

A principal object of the present invention is to provide an improved dashpot brake wherein the reaction force provided is proportional to the speed of a movable cylinder and is also determined by the relative position of the cylinder and piston.

To effect the foregoing and other objects of the invention, the dashpot brake generally comprises a cylinder mounted for movement with respect to a fixed piston having at least two passageways communicating between the interior of the cylinder and its outside. The periphery of the piston face is connected to the periphery of the "open" end of the cylinder by a flexible seal. One of the passageways has its exit port at a first position on the piston such that when the cylinder-piston interspace is at or near minimum, the exit port is overlain and sealed off by the flexible seal, yet when the cylinder is withdrawn from the first position so that the interspace or chamber inside the cylinder is enlarged, the flexible seal has also been moved or rolled to a position wherein it no longer covers the exit port. The other passageway is located such that it is never sealed by the flexible seal regardless of the relative positions of the piston and cylinder.

Other objects of the invention will in part be obvious and will in part appear hereinafter. The invention accordingly comprises an apparatus possessing the construction, combination of elements, and arrangement of parts which are exemplified in the following detailed disclosure, and the scope of the application of which will be indicated in the claims.

Figure 1:
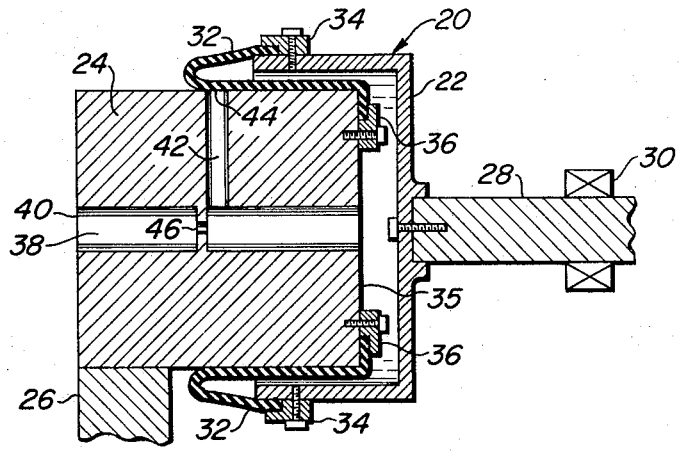
Figure 2:
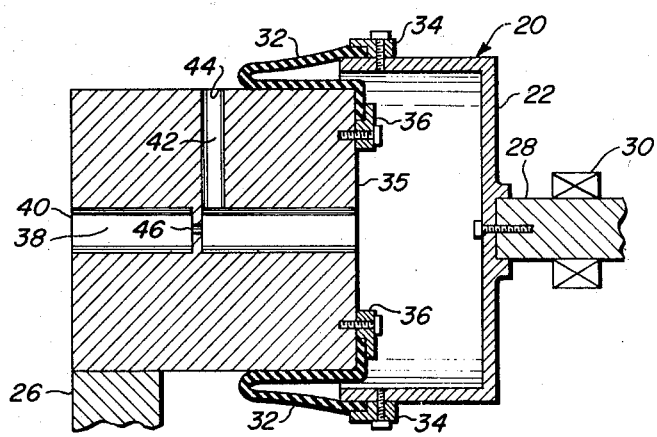

For a fuller understanding of the nature and objects of the present invention, reference should be had to the following detailed description taken in connection with the accompanying drawings wherein:

FIG. 1 is a cross-section taken through an embodiment of the present invention showing the elements thereof in a position adjacent the end of travel; and FIG. 2 shows the elements of the embodiment of FIG. 1 at another position in their travel.

The present device is a decelerating or braking means in the form of a dashpot 20 shown in detail in FIGS. 1 and 2. The dashpot includes hollow cylinder 22 and piston 24 dimensioned to fit loosely within the interior of cylinder 22. Piston 24 typically is fixedly mounted as on support 26 shown only in fragment. Cylinder 22 is centrally mounted at its closed end upon shaft 28 so as to be movable axially with the latter which is mounted in bearings 30. The circular periphery of the open end of cylinder 22 is connected to a portion of piston 24 that extends into the cylinder, by a flexible, partially everted cylindraceous seal 32. The latter is well known in the art and is typified by those described in the literature of the Bellofram Company of Massachusetts and in U.S. Pat. No. 2,849,026. Seal 32 is connected about the edge of the periphery of the open end of cylinder 22 by appropriate means such as ring clamp 34 and to the edge of the piston face 35 by circular clamp 36.

Piston 24 is provided with a fluid leakage path between face 35 (and thus the interior of the cylinder) and the outside of the piston. This path is shown as passageway 38 extending from face 35 to exit port 40 preferably located adjacent the axis of the piston. Another fluid leakage path is provided between face 35 and a cylindrical side of piston 24. This path which may be, but is not necessarily internally joined to a portion of passageway 38 is shown as passageway 42 extending from a portion of passageway 38 to exit port 44. The relative locations of port 44 and seal 32 are quite important as will be apparent from the following description of the operation of the device.

As shown in FIG. 2, cylinder 22 and piston 20 are comparatively separated, and it can be assumed that this is the beginning position for a half-cycle movement (i.e. to the left) of whatever elements are coupled to shaft 28. It will be seen that an everted portion of seal 32 lies inside the remainder of the seal and some also lies between the internal cylindrical surface of cylinder 22 and the external cylindrical surface of piston 20. As cylinder 22 moves toward the left, it will try to compress any fluid (either liquid or gas) occupying the interspace between the cylinder and piston sealed by seal 32. This serves then to express the fluid out through both passageways 38 and 42. Preferably, passageway 42 provides a path for leakage of a considerably larger volume of fluid per unit time than does passageway 38 and for this reason, the latter is shown as including restricting orifice 46.

It will be appreciated that with fluid flowing through both passageways with change in the dimensions of the latter, the device in effect operates precisely as an ordinary dashpot which is intended to provide a reaction force proportional to the speed of motion of the cylinder relative to the piston. By providing a relatively easy fluid path through passageway 42 the extent of the reaction force can be made very small so that the cylinder therefore can be driven to high speeds very quickly.

As the cylinder continues to close upon the piston, seal 32 is rolled everted along the cylindrical periphery of the piston in an axial direction. This rolling motion of the seal then ultimately brings the latter to the position of exit port 44. The closure of exit port 44 by seal 32 as shown in FIG. 1 is thus accomplished in a manner which progressively diminishes the effective cross-section aperture of the exit port from fully open to fully closed. As the flow of fluid out of passageway 42 is thus progressively impeded, it will be apparent that the reaction force exerted by the fluid in the cylinder-piston interspace will increase smoothly from the minimal amplitude determined by the combined leakage paths of both passageways to the maximum amplitude determined by the constricted leakage path finally provided only through orifice 46. The motion of the rolling edge progresses axially along the piston at a speed which is half of the speed of motion of the piston and cylinder relative to one another. It will be apparent that the reaction forces provided by braking device 20 are not only proportional to the motion of the cylinder but also are determined by the relative positions of the cylinder and piston.

Motion of the cylinder to the right of course uncovers port 44 so that the cycle can be repeated. Where the scan portion of the cycle is to be carried out at much lower speeds than the return portion, the size of orifice 46 can be set so that for these lower speeds, the reaction forces provided by the restriction of fluid flow in passageway 38 are not difficult to overcome without undue strain on a motor or other system driving.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A dashpot for braking limited motion of a member and comprising, in combination,
    a hollow cylinder mounted for movement with said member,
    a piston fixedly mounted with respect to said cylinder so as to define an interspace between a face of said piston and the interior of said cylinder variable between a maximum and a minimum volume depending upon the extreme positions of travel of said cylinder,
    a flexible cylindraceous seal connected about said piston and mounted about the periphery of said cylinder for movement therewith to provide an everted rolling travel axially along said piston,
    a first passageway for fluid between said interspace and an exit port at the exterior of said piston, said exit port being disposed to be covered and uncovered by said seal at different positions of the latter in its travel along said piston, and
    a second passageway for fluid between said interspace and a second exit port disposed out of the path of travel of said seal.

2. The combination defined in claim 1 wherein the two passageways are dimensioned to permit respectively different fluid flow rates therethrough for the same pressure head on said fluid.

3. The combination defined in claim 2 wherein said first passageway is dimensioned to permit a greater fluid flow rate than said second passageway.

References Cited

UNITED STATES PATENTS 967,166   8/1910   Brandt _____ 74—18.2 X

GEORGE E. A. HALVOSA, Primary Examiner

U.S. Cl. X.R.

74—18.2; 188—100